United States Patent Office 3,061,560
Patented Oct. 30, 1962

3,061,560
POLYVINYL ESTER DISPERSIONS AND PROCESS FOR PREPARING SAME
Alfred Kühlkamp and Gerold Koch, Frankfurt am Main, Germany, assignors to Farbwerke Hoechst Aktiengesellschaft vormals Meister Lucius & Brüning, Frankfurt am Main, Germany, a corporation of Germany
No Drawing. Filed Sept. 17, 1959, Ser. No. 840,516
Claims priority, application Germany Sept. 20, 1958
13 Claims. (Cl. 260—17)

The present invention relates to a process for the manufacture of dispersions of polyvinyl esters and copolymers of vinyl esters in which dispersions the polymer particles are adjusted to a definite size and to dispersions so made.

It is known to polymerize vinyl esters in aqueous phase. In German Patent 727,955, for example, there is described the manufacture of stable emulsions of polymerization products with the use of polyvinyl alcohols as protective colloid. Another possibility for the polymerization in aqueous phase is described in German Patent 744,318 according to which the polymerization is carried out in an aqueous solution of vinylsulfonic acid or the salt thereof in the presence of a soap-like emulsifier. In this case, too, stable emulsions are obtained.

Furthermore, it is known to use other protective colloids of animal or vegetable origin instead of polyvinyl alcohol.

On the other hand, it is known that a smaller or larger addition of salt involves disadvantages in the case of many dispersions since it favors the tendency to coagulate. It is possible, for example, to bring about coagulation of a stable dispersion by the addition of a salt.

The size of the latex particles as well as the distribution of the particle sizes are important for the quality of a dispersion. The wet abrasion resistance of films prepared from said dispersions and the stability to cold of the latices are influenced inter alia by the particle size of the latices.

Now we have found that when preparing aqueous dispersions of polyvinyl esters or copolymers with vinyl esters in the presence of water-soluble cellulose derivatives as protective colloid—the use of oxethylated celluloses as water-soluble cellulose derivatives being especially advantageous—the medium particle size of the latex can surprisingly be regulated within a range of 0.5 to 15μ, preferably 0.5 to 4μ, by using in the aqueous liquor a definite combination of the water-soluble cellulose derivatives with alkali metal salts, preferably the sodium and potassium salts of hydroxy-diphenyls, more particularly of 2-hydroxy-diphenyl (it is known that the alkali metal salts of hydroxydiphenyls are capable of hydrolyzing), in the presence of alkali metal salts, for example the sodium salts of mineral and/or organic mono- or polybasic acids, and/or semi-esters of saturated or unsaturated dicarboxylic acids. The unesterified carboxylic group of the semi-esters may be wholly or partially saturated with alkali metal, preferably with sodium. As far as the additives are soluble in water as well as in the monomers they can be first dissolved in the monomer and then introduced with the monomer into the liquor. In the case of substances of this kind which are soluble in water as well as in organic media it is likewise possible, of course, to add part of said substances to the aqueous liquor and to dissolve the other part in the monomer. The content of oxethyl of the oxethylated celluloses can vary between 10 and 40%, preferably between 25 and 35% by weight. The viscosity of the oxethylated celluloses shall vary, in general, between 100 and 1000, preferably between 200 and 400 centipoises measured at 20° C. as a solution of 5% in water. In special cases there may be used oxethylated celluloses having values somewhat outside the indicated values.

In the process according to the invention there may be used as suitable mineral salts, for example, primary and secondary water-soluble salts of phosphoric acid per se and in admixture, water-soluble salts of boric acids, for example tetraboric acid. As salts of organic acids there may be used inter alia salts of acetic acid, citric acid, adipic acid. As semi-esters of dicarboxylic acids there come into consideration, for example the semi-esters of succinic acid, maleic acid, itaconic acid and of acids having longer carbon chains, such as sebacic acid. As alcohol components of the semi-esters there may be used, for example mono- or polyhydric aromatic alcohols, such as benzyl alcohol or ortho-xylylene glycol, hydroaromatic alcohols, such as cyclohexanol, methylcyclohexanol, quinitol or a straight or branched chain, primary, secondary, or tertiary mono- or polyhydric aliphatic alcohol having 1 to 30, preferably 6 to 10 carbon atoms, such as hexyl alcohol, decyl alcohol or 1,8-octane-diol. The following amounts may be used 0.1 to 15%, preferably 1.0 to 5.0% of water-soluble cellulose derivatives,
0.01 to 10%, preferably 0.1 to 5.0% of salts,
0.001 to 10%, preferably 0.1 to 3.0% of semi-esters of dicarboxylic acids,
0.01 to 10%, preferably 0.1 to 3% of alkali metal salts of hydroxydiphenyls;

all percentage figures mentioned being calculated on the ready dispersion as obtained after the polymerization. In special cases smaller or larger amounts can be used.

It has further been found that semi-esters of organic dicarboxylic acids in which the alcohol component is a polyalkylene glycol or a polyalkylene glycol derivative may be used with special advantage. The structure of these polyalkylene glycols and their derivatives is illustrated by the following general formulae:

(I) 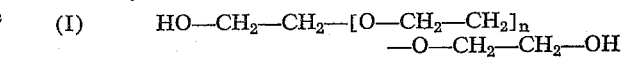

wherein $n$ is a whole number which may vary within a very wide range, for example a range of 1 to more than 20,000 and advantageously of 1 to 500.

(II) 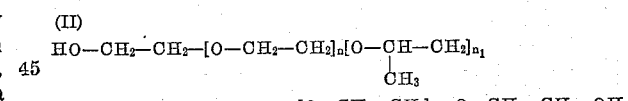

wherein $n$ has the meaning given above and $n_1$ is 1 or a whole number which may be greater than 500 and is advantageously within the range of 1 to 50.

(III) 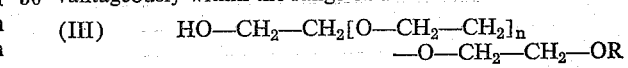

wherein R represents a hydrocarbon radical, for example a saturated aliphatic radical advantageously containing up to 8 carbon atoms in a straight or branched chain, a cycloaliphatic radical, for example a cyclohexyl radical or an aromatic radical, for example a phenyl or naphthyl radical, or an acyl radical of a saturated fatty acid containing up to 8 carbon atoms in a straight or branched chain, these radicals being substituted, if desired, for example by a halogen atom, and $n$ has the same meaning as in Formula I.

(IV) 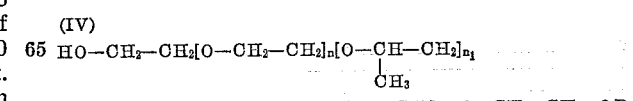

wherein R, $n$ and $n_1$ have the same meanings as in Formulae II and III.

The process of the invention may also be carried out with the use of polyalkylene glycols containing nitrogen, i.e. compounds in which, for example, one hydroxyl group is substituted by mono- or polyfunctional amines, for example a compound of the general formula (V) 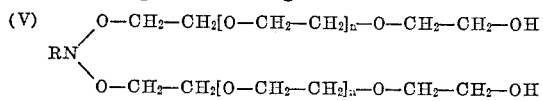

wherein R represents hydrogen or a hydrocarbon radical, for example a cycloaliphatic radical such as a cyclohexyl radical, an aromatic radical such as a phenyl or naphthyl radical and advantageously an aliphatic radical, for example a saturated aliphatic radical which advantageously contains up to 8 carbon atoms in a straight or branched chain, these radicals being substituted, if desired, for example by a halogen atom, and $n$ has the same meaning as in Formula I.

Mixtures of different polyalkylene glycol semi-esters may also be used.

It is particularly advantageous to use compounds which have been obtained by the esterification of unetherified polyalkylene glycols with unsaturated dicarboxylic acids. These compounds containing activated double bonds may correspond, for example, to the following general formula:

(VI) 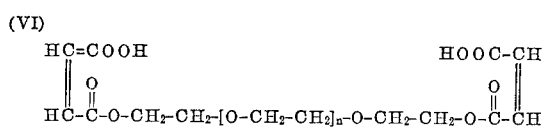

wherein $n$ has the same meaning as in Formula I.

The gel content of the dispersion increases with the amount in which the said compounds containing reactive double bonds are added to the liquor as is evident from the following examples which serve to illustrate the invention without limiting it thereto, the parts being by weight.

*Example 1*

100 parts of vinyl acetate and 0, 0.2 and 0.6 part, respectively, of a semi-ester of maleic acid and an alcohol containing 18 carbon atoms which had been etherified with 20 mols of ethylene oxide were run, at 75 to 80° C., within 3 to 5 hours into a liquor prepared from 2.4 parts of cellosize WP–3 of UCCC (water-soluble hydroxyethyl (oxethylated) cellulose manufactured by Union Carbide and Carbon Corporation), 0.2 part of sodium phenylphenolate, 0.33 part of potassium persulfate, 0.28 part of $Na_2HPO_4.12H_2O$, 0.12 part of $NaH_2PO_4.2H_2O$ and 76 parts of water. The polymerization temperature amounted to 77 to 80° C. and a conversion of more than 99% was attained. The dispersion so obtained had the following properties:

Solid content _____ percent__ 56 to 58
Content of monomers _____ do____ <1
Latex viscosity (20° C.) _____ poises__ 10 to 20
K-value _____ 60 to 70
(determined in a mixture consisting of 85% by weight of methanol and 15% by weight of water).

The particle size varied with the amount of semi-ester added as is evident from the following table:

| Amount of semiester added | Particle sizes in the dispersion | | |
|---|---|---|---|
| | >5μ | 5 to 2μ | 2 to 1μ |
| | Percent | Percent | Percent |
| 0.2 part | 9 | 46 | 45 |
| 0.6 part | 12 | 47 | 41 |
| | 30 | 64 | 6 |

*Example 2*

The process was carried out in the same manner as described in Example 1 but the semi-ester of Example 1 was replaced by a semi-ester of a polyethylene oxide (molecular weight: about 4000) which had been esterified on both sides with maleic acid and corresponded to the following formula

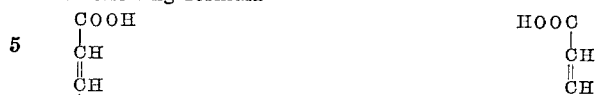

The semi-ester was added in an amount of 0, 0.1 and 0.2 part, respectively. The dispersion so obtained had the following properties:

Solid content _____ percent__ 56 to 58
Content of monomers _____ do____ <1
Latex viscosity (20° C.) _____ poises__ 30 to 50
K-value _____ 50 to 70

The change in the particle sizes can be seen from the following table:

| Amount of semiester added | Particle sizes in the dispersion | | |
|---|---|---|---|
| | 5μ | 5 to 2μ | 2 to 1μ |
| | Percent | Percent | Percent |
| 0.1 part | 5 | 39 | 56 |
| | 8 | 46 | 46 |
| 0.2 part | 11 | 52 | 37 |

By the use of the above compound containing two double bonds, the gel content of the dispersion was increased depending on the amount of semi-ester used:

Amount of semi-ester used:     Gel content, percent
0.1 part _____ 2.6
0.2 part _____ 4.3
0.4 part _____ 65.0

We claim:

1. A process for the manufacture of a polyvinyl ester dispersion which comprises polymerizing at least one vinyl ester in an aqueous emulsion in the presence of 0.1 percent to 15 percent of a protective colloid consisting of a water soluble cellulose derivative, 0.1 percent to 3 percent of an emulsifier consisting of an alkali metal salt of monohydroxydiphenyl, said emulsifier being capable of hydrolysis and 0.1 percent to 3 percent of a semi-ester of an aliphatic dicarboxylic acid having 4–10 carbon atoms with a member selected from the group consisting of polyalkylene glycols of the general formulae (I)   $HO-CH_2-CH_2-[O-CH_2-CH_2]_n-O-CH_2-CH_2-OH$ (II) 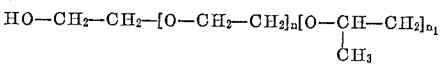

(III)   $HO-CH_2-CH_2[O-CH_2-CH_2]_n-O-CH_2-CH_2-OR$ (IV) 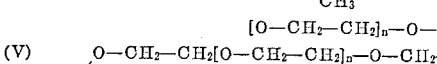

(V) 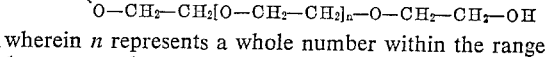

wherein $n$ represents a whole number within the range of 1 to more than 20,000, $n_1$ represents a whole number within the range of 1 to more than 500, R represents a hydrocarbon radical, and $R_1$ is a member selected from the group consisting of hydrogen and hydrocarbon radicals, whereby polymer particles of an essentially uniform size between 0.5 micron and 15 microns are produced, the size depending on the concentration of semi-esters present, all percentages being calculated on the weight of the dispersion.

2. A process as in claim 1 wherein $n$ is a whole number between 1 and 500 and $n_1$ is a whole number between 1 and 50.

3. A process as in claim 1 wherein said polyalkylene glycol has the formula

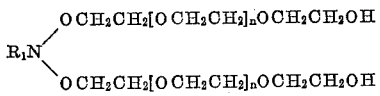

4. A process as in claim 1 wherein said semi-ester has the formula

HO₂CCH=CHCO₂CH₂CH₂[OCH₂CH₂]ₙ
OCH₂CH₂O₂CCH=CHCO₂H

5. A process as in claim 3 wherein $n$ is a whole number between 1 and 500.

6. A process as in claim 4 wherein $n$ is a whole number between 1 and 500.

7. A process for the manufacture of copolymer dispersions which comprises copolymerizing vinyl ester monomers and monomers of an ester of an unsaturated dicarboxylic acid and an alcohol having one to eight carbon atoms, said copolymerization occurring in an aqueous emulsion in the presence of 0.1 percent to 15 percent of a protective colloid consisting of oxethylated cellulose, 0.1 percent to 3 percent of an emulsifier consisting of an alkali metal salt of monohydroxy-diphenyl, said emulsifier being capable of hydrolysis, 0.1 percent to 5 percent of a salt of an acid which is a member of the group consisting of phosphoric, boric, acetic, citric, and adipic acids, and 0.1 percent to 3 percent of a semi-ester of an aliphatic dicarboxylic acid having 4–10 carbon atoms with a member selected from the group consisting of polyalkylene glycols of the general formulae

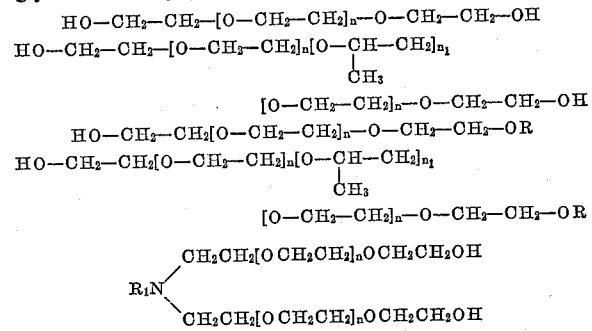

wherein $n$ represents a whole number within the range of 1 to more than 20,000, $n_1$ represents a whole number within the range of 1 to more than 500, R represents a hydrocarbon radical, and $R_1$ is a member selected from the group consisting of hydrogen and hydrocarbon radicals, whereby copolymer particles having an essentially uniform size between 0.5 micron and 15 microns are produced, the size depending on the concentration of acid salts and semi-esters present, all percentages being calculated on the weight of the dispersion.

8. A process as in claim 7 wherein $n$ is a whole number between 1 and 500 and $n_1$ is a whole number between 1 and 50.

9. A process as in claim 7 wherein said polyalkylene glycol has the formula

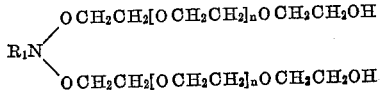

10. A process as in claim 7 wherein said semi-ester has the formula

HO₂CCH=CHCO₂CH₂CH₂[OCH₂CH₂]ₙ
OCH₂CH₂O₂CCH=CHCO₂H

11. A polyvinyl ester dispersion comprising polyvinyl ester particles of an essentially uniform size between 0.5 micron and 15 microns dispersed in an aqueous solution of 0.1 percent to 15 percent of a protective colloid consisting of oxethylated cellulose and 0.1 percent to 3 percent of an emulsifier consisting of an alkali metal salt of monohydroxy-diphenyl, said emulsifier being capable of hydrolysis and 0.1 percent to 3 percent of a semi-ester of an aliphatic dicarboxylic acid having 4–10 carbon atoms with a member selected from the group consisting of polyalkylene glycols of the general formulae

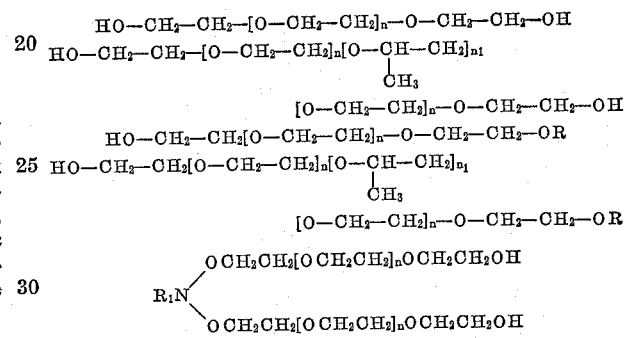

wherein $n$ represents a whole number within the range of 1 to more than 20,000, $n_1$ represents a whole number within the range of 1 to more than 500, R represents a hydrocarbon radical, and $R_1$ is a member selected from the group consisting of hydrogen and hydrocarbon radicals, all percentages being calculated on the weight of the dispersion.

12. A dispersion as in claim 11 wherein said polyalkylene glycol has the formula

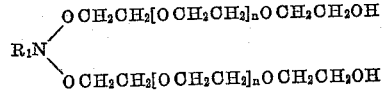

13. A dispersion as in claim 11 wherein said semi-ester has the formula

HO₂CCH=CHCO₂CH₂CH₂[OCH₂CH₂]ₙ
OCH₂CH₂O₂CCH=CHCO₂H

References Cited in the file of this patent

FOREIGN PATENTS 658,426    Great Britain _____ Oct. 10, 1951

OTHER REFERENCES

Schwartz et al.: "Surface Active Agents and Detergents," volume II, published by Interscience Publishers, New York, 1958, pages 130–131.